United States Patent [19]

Beaton

[11] 4,067,115
[45] Jan. 10, 1978

[54] ROLLING MILL EQUIPMENT

[75] Inventor: Gerald V. Beaton, Rotherham, England

[73] Assignee: British Steel Corporation, London, England

[21] Appl. No.: 672,977

[22] Filed: Apr. 2, 1976

[30] Foreign Application Priority Data

Apr. 8, 1975 United Kingdom ............... 14397/75

[51] Int. Cl.² ................................................ G01B 5/14
[52] U.S. Cl. .................................. 33/182; 33/DIG. 13
[58] Field of Search ......................... 33/182, DIG. 13; 73/88.5 R, 88.5 S

[56] References Cited

U.S. PATENT DOCUMENTS

| 2,368,129 | 1/1945 | Fors et al. | 33/182 |
| 2,761,216 | 9/1956 | Gollub | 33/DIG. 13 |
| 3,137,075 | 6/1964 | Graham | 33/182 |
| 3,239,938 | 3/1966 | Kaercher | 73/88.5 R |

FOREIGN PATENT DOCUMENTS 1,282,301 11/1968 Germany ...................... 33/DIG. 13

OTHER PUBLICATIONS

IBM T.D.B. Hole Sensing Device, Gustafson, vol. 3, No. 11, 4-61.

Primary Examiner—Harry N. Haroian
Attorney, Agent, or Firm—Bacon & Thomas

[57] ABSTRACT

A rolling mill alignment monitor comprising a bar insertable between a roll 'pass' and having first and second portions flexibly mounted relatively to one another and carrying strain gauge sensors responsive to any displacement between these portions. By detecting this displacement any misalignment in the pass between the rolls themselves and/or relative to an entry guide box to the pass may be detected.

7 Claims, 5 Drawing Figures

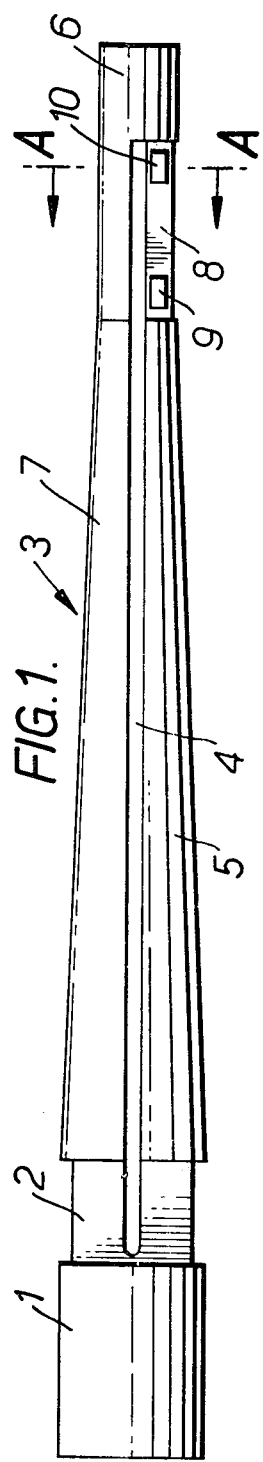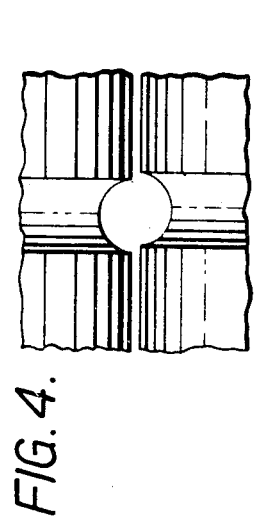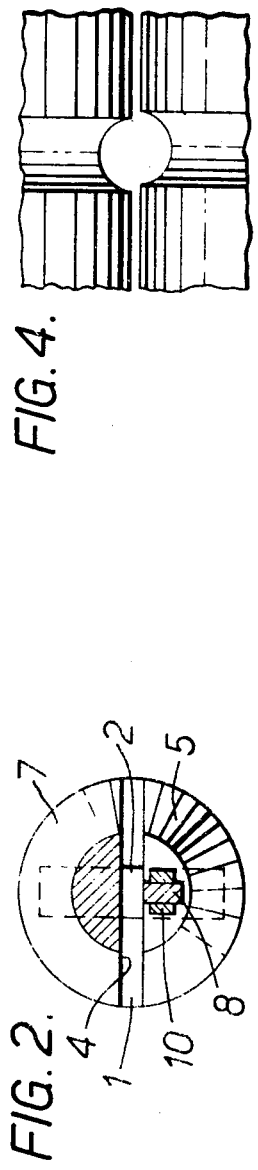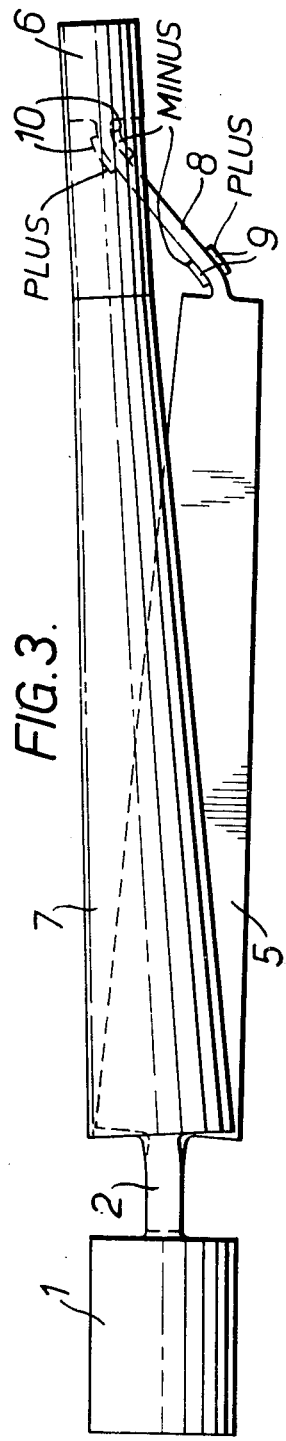

ROLLING MILL EQUIPMENT

This invention relates to a rolling mill alignment monitor which may be applied as an aid to axial alignment of the mating roll passes (roll profiles or 'holes) both with respect to one another and with respect to the entry guide box.

From one aspect the present invention provides a rolling mill alignment monitor comprising a bar insertable between a roll 'pass' and having first and second portions flexibly mounted relatively to one another and carrying sensors responsive to any displacement between said portions, whereby any misalignment in the pass between the rolls themselves and/or relative to an entry guide box to the pass may be detected.

The first and second portions may be in the form of parallel 'prongs' extending from a common hand-held shank, this embodiment being particularly suitable for insertion in a roll pass for measuring any axial misalignment between the rolls themselves. In particular, this condition may be detected by the bar being longitudinally split in the plane of the nip of the rolls, save for a thin web conjoining the foremost ends of the two portions, the two bar portions being movable relatively to one another as they are fed through the pass. Alternatively, the first and second portions may be co-axial with the sensors mounted between them. This embodiment is particularly suitable for measuring any misalignment between the roll pass and the entry guide bar, one portion being clamped in the latter and the other being inserted into the pass.

Both portions of the bar may be tapered, particularly in the parallel prong or split embodiment; in the other embodiment envisaged only one portion, namely the 'insertable' or 'search' portion may be tapered.

By using two bars the 'split' one may first be fed through the rolls in order to align the pass between the rolls themselves and then alignment with the guide box is effected by feeding the solid bar through the aligned pass. Both horizontal and vertical components of deflection may readily be determined by the latter.

A single bar may however alternatively be designed for performing both functions.

Strain gauges may conveniently be employed as the sensors, these gauges being mounted on the web in the one case and on the neck in the other. Electrically these gauges may be connected in a bridge circuit feeding an operational amplifier, the output being indicative of displacement.

In order that the invention may be fully understood, two forms of the bar will now be described by way of example with reference to the accompanying drawings in which:

FIG. 1 is a side elevation of a split bar according to this invention;

FIG. 2 is a section on the bar along A — A;

Figure 5:
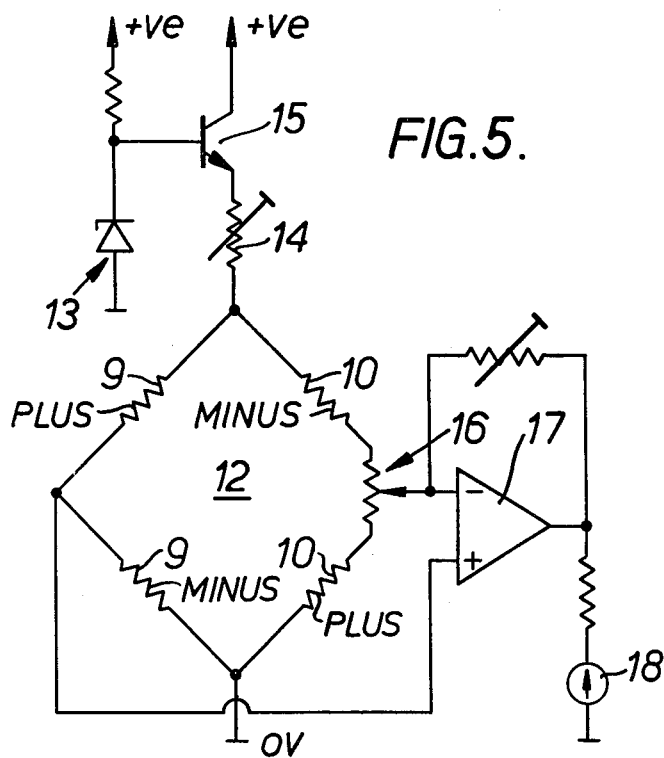

FIG. 3 schematically illustrates the bar (greatly exaggerated) when displaced through a misaligned pass;

FIG. 4 is a view of mating rolls exhibiting a misaligned pass giving rise to the FIG. 3 condition;

FIG. 5 is a schematic diagram of the sensor circuitry; and

Figure 6:
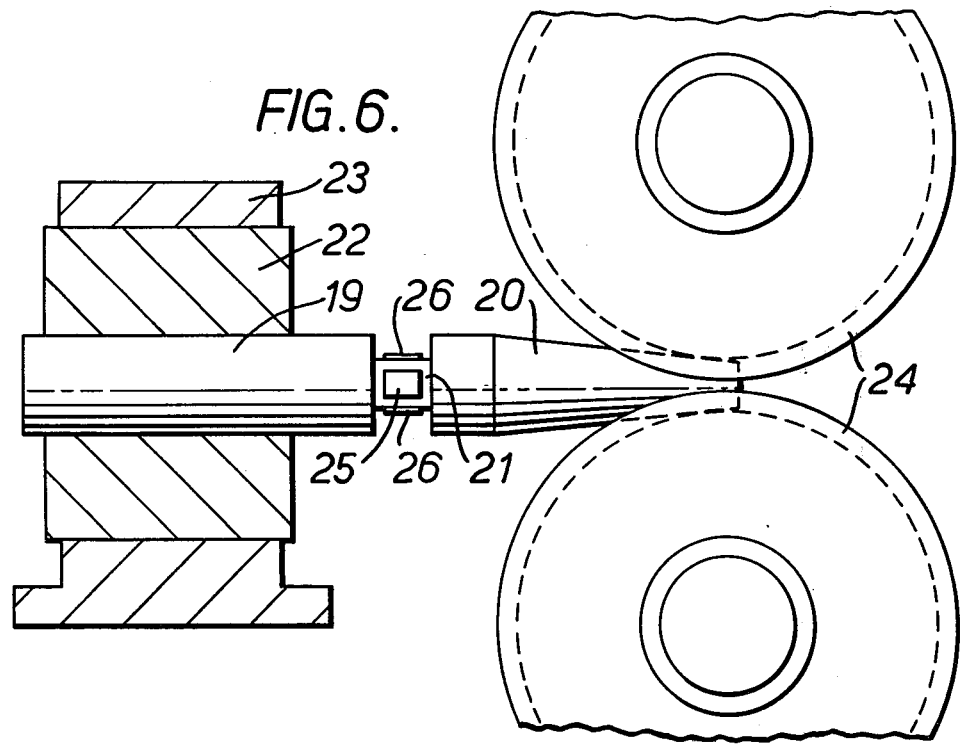

FIG. 6 is a side elevation of a solid bar according to this invention mounted in a guide box and being presented to a roll pass.

Referring now to FIGS. 1 and 2 a steel bar is machined to form a circular-section tang 1, (which may conveniently be hand-held), a rectangular-section neck portion 2 and a conical circular-section body 3 which is split at 4 along a major portion of its longitudinal axis. The foremost end of the split body is machined so that the lower semi-circular part 5 is joined to a nose portion 6, defined on the upper part 7, by a thin rectangular-section web 8. This web carries two pairs of resistance strain gauges 9 and 10 on its opposite sides. Insulated leads (not shown) are connected to these gauges and are carried along the bar to related sensor circuitry to be described.

The principle of operation of the bar when presented to a misaligned pass in static rolls is shown in FIG. 3 in which a situation is envisaged where both upper and lower parts 5 and 7 are flexed about the neck 2 from a mean centre line as a result of a misaligned pass such as that shown in FIG. 4. The FIG. 3 illustration is, of course, greatly exaggerated for clarity, but the effect on the strain gauges can be readily appreciated, the gauges marked plus (positive) being in tension and the opposite associated gauges marked minus (negative) being in compression. The stresses in these gauges are proportional to displacement and accordingly corrective measures can be taken on the axial alignment of the rolls to obtain a null reading.

More particularly the sensor circuitry shown in FIG. 5 basically comprises the gauges 9 and 10 arranged in the fashion of a bridge 12 which is fed from a constant current source 13, the current value being set by a resistor 14 through a transistor 15. The output from the bridge is applied via a potentiometric balance control 16 to an integrated operational amplifier 17 the output therefrom being indicated on a meter 18.

The balance control is, of course, present for a perfectly aligned pass, the meter 18 then giving a null reading - any out of balance in the bridge sensor circuitry is then indicative of roll pass misalignment. In practice, the preset alignment is achieved by feeding the bar into a truly round hole in a test gauge and adjusting the balance control as described.

The principle of this invention is extended in FIG. 6 to encompass roll pass/roll guide box alignment.

In this embodiment a solid circular-section bar is utilised, the bar having a tang 19 and a plain conical body 20 with an intermediate square-section neck portion 21. The circular-section tank 19 is slidably mounted in the bore of a dummy cartridge 22 in the guide box 23 and the whole is movable between co-operating rolls 24. Four strain gauges 25, 26 are mounted on opposite sides of the neck portion 21 and any misalignment in a vertical mode or in a horizontal mode is appropriately indicated through sensor circuitry in a similar fashion to that shown in FIG. 5, but in this instance separate indications are given for vertical and horizontal misalignments.

As before the circuitry is adjusted to give a null reading for a perfectly aligned roll pass/guide box this being achieved in this instance by placing the bar in a tubular jig which closely fits the tang 19 and accommodates the conical body 20 in a concentric aperture. With the conical body then being held concentrically with the parallel section tang the circuit is balanced for zero output from the strain gauges.

The two embodiments thus provide for misalignment correction as between the roll pass themselves and between the roll pass and the roll guide box. Correction in this fashion thus enables setting up time to be significantly reduced compared with the practice hitherto of rolling trial bars and the incidence of scrap or off-standard material subsequently rolled may also be significantly reduced.

Although this invention has been described with reference to the particular embodiments illustrated, it is to be understood that various modifications may readily be made without departing from the scope of this invention. For example, the two forms of measurement described with reference to the separate embodiments may readily be incorporated in a single composite bar as envisaged in the preamble to this specification. Further, the roll alignment is not limited to circular 'holes' or passes and other shapes may readily be aligned with appropriately profiled bars. Separate tapered cones may be provided for insertion over a parallel-section 'arbor' on the guide/pass alignment bar in this regard. Moreover, the neck portion together with the sensors may conveniently be sheathed on the guide/pass alignment bar. As regards the 'split' pass alignment bar the web on which the strain gauges are mounted may, on the larger sizes, lie perpendicular to the bar axis and not parallel to it as shown in the drawing.

In addition this invention could readily be adopted in combination with dynamic roll alignment measurement as described in co-pending American patent application No. 593389 in which eddy current sensors are adapted for measuring actual or relative roll displacement.

We claim:

1. A rolling mill alignment monitor comprising
   a bar, said bar having
   a common shank and
   first and second portions in the form of tapered flexibly mounted prongs extending from the shank and together insertable into roll pass defined between cooperating mill rolls,
   a web extending between and secured to the said portions, and
   sensors carried on said web and responsive to any displacement between the first and second portions whereby to detect any misalignment of the pass between the said rolls.

2. An alignment monitor according to claim 1, wherein the bar is split longitudinally to define said portions, said web on which the sensors are mounted joining the ends of the two portions remote from the shank.

3. An alignment monitor according to claim 2, wherein the first portion includes
   a reduced section protuberance constituting the remote end of said first portion and wherein the second portion lies behind said protuberance, the said web extending axially of the bar between the protuberance and the remote end of the second portion.

4. A rolling mill alignment sensor comprising
   a bar, said bar having
   a common shank and
   first and second portions in the form of flexibly mounted prongs extending from the shank and tapered for insertion into a roll pass
   a web joining the ends of the two portions remote from the shank, and
   sensors mounted on said web responsive to any displacement between said portions whereby on insertion into the pass any misalignment between the rolls may be detected.

5. An alignment monitor according to claim 4, wherein the sensors are resistance strain gauges mounted on opposite sides of the web, and comprising
   an electrical bridge circuit, the said sensors being connected in separate arms thereof.

6. A rolling mill alignment monitor comprising
   a bar, said bar having
   a first portion for insertion in an entry guide box to a roll pass
   a second portion coaxial therewith and tapered for insertion in the roll pass and
   a reduced section neck portion between the first and second portions whereby these two portions are flexibly displaceable relatively to one another, and
   sensors carried on the neck portion responsive to any such displacement whereby any misalignment between the entry guide box and the roll pass may be detected.

7. An alignment monitor according to claim 6, wherein the sensors are resistance strain gauges mounted on opposite sides of the neck portion, and comprising
   an electrical bridge circuit, the said sensors being connected in separate arms thereof.

* * * * *